Figure 1:
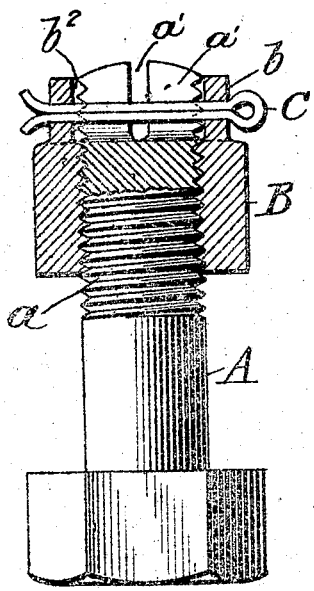

J. S. CONRADI, E. TILSTON & P. W. MASSON.
LOCK NUT DEVICE.
APPLICATION FILED JAN. 27, 1909.

933,420.

Patented Sept. 7, 1909.

Witnesses:

Inventors:

UNITED STATES PATENT OFFICE.

JULIUS SAMUEL CONRADI, OF BELVEDERE, EDWARD TILSTON, OF MANCHESTER, AND PETER WATSON MASSON, OF BELVEDERE, ENGLAND.

LOCK-NUT DEVICE.

933,420.

Specification of Letters Patent. Patented Sept. 7, 1909.

Application filed January 27, 1909. Serial No. 474,566.

*To all whom it may concern:*

Be it known that we, JULIUS SAMUEL CONRADI, EDWARD TILSTON, and PETER WATSON MASSON, all subjects of the King of Great Britain, residing, respectively, at Osborne House, Belvedere, in the county of Kent, England, 110 Clarence road, Rusholme, Manchester, in the county of Lancaster, England, and "Edgeworth," Belvedere, in the county of Kent, England, have invented certain new and useful Improvements Relating to Lock-Nut Devices, of which the following is a specification.

This invention relates to lock-nut devices, the object being to provide a simpler, more effective and less troublesome form of locking arrangement than those at present in use.

The said invention relates more particularly to that form of locking device known as the "Castle" nut.

Instead of cutting radial slots across the flats or corners of the nuts and drilling a corresponding hole for the split pin in the end of the bolt as is done with the Castle nut, it has been proposed to reverse this method and drill holes in the nut and cut a slot transversely in the end of the bolt. A serious defect however arises in connection with this arrangement by reason of the fact that when the nut is tightened up on the bolt it has the effect of contracting the said slot thus preventing the split pin from being introduced. This action is chiefly due to the angle of the V-threads in the nut and on the bolt; the upward thrust of the nut being resolved into two other forces, one of which acts transversely to the axis of the bolt itself and so causes the contraction referred to above.

The object of our invention is to overcome this defect, for which purpose we propose to recess the outer end of the nut, through which the transverse holes are formed thereby removing the threads to an extent corresponding with the depth of the said recess. We also propose as an alternative to remove the threads at the end of the bolt for a length approximately corresponding to the depth of the slot before-mentioned or we may use both these arrangements in combination.

In order to avoid weakening the effective strength of the threads of the nut, we prefer in most cases to increase the depth of the nut by an amount equal to that necessary for providing the transverse holes above mentioned and in order to give a neater appearance to the nut, as well as to permit the split pin to lie more snugly in place, we may turn down the nut from its hexagonal or polygonal form to a cylindrical form, *i. e.* the additional length provided on the nut for the holes is made cylindrical.

In order that our said invention may be clearly understood and readily carried into effect we will describe the same more fully with reference to the accompanying drawings in which:—

Figure 2:
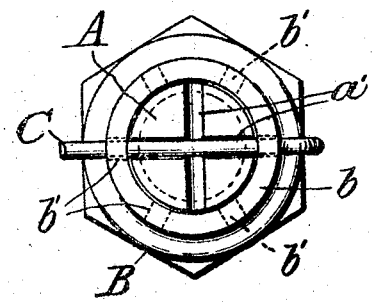

Figure 1 is a longitudinal section through a nut lock constructed in accordance with the invention. Fig. 2 is an end view of the nut lock shown in Fig. 1, and Fig 3 is a view similar to Fig. 1, but showing a modified arrangement of the parts.

In the form of the device shown in Fig. 1, the bolt A is provided with a threaded portion *a* which extends completely to the smaller end of the bolt, at which end one or more open-ended slots *a'* are cut, extending longitudinally of the bolt. In the embodiment illustrated, there are two slots in the end of the bolt and these intersect each other at right angles, but it is to be understood that the number and precise arrangement of the slots do not affect the gist of the invention. Coacting with the bolt A is a nut B, the main or body portion of which is of the usual polygonal shape and is threaded interiorly to correspond with the threads on the bolt. At one end the nut is provided with an extension or turret *b* which is preferably of cylindrical shape and is provided with a circumferential series of transverse holes *b'* through which a split pin C is passed, the intermediate portion of said pin being engaged with either one of the slots *a'* in the bolt and thereby locking the nut rigidly in its adjusted position.

According to this invention, the slot or slots in the bolt are prevented from constriction by the nut, which would make the insertion of the locking pin in the slot difficult or impossible, by discontinuing the threaded engagement of the bolt and nut for a distance corresponding approximately to the depth of the slot or slots in the bolt. In this way engagement between the nut and the slotted end of the bolt is prevented when the parts are in position to receive the transverse locking pin. In the form of the device shown in Fig. 1, this is effected by counterboring the nut at the end where the extension $b$ is located, whereby a plain or unthreaded portion $b^2$ is provided, which portion is out of engagement with the threads of the bolt. It will be noted that the length of the counterbore or plain portion $b^2$ corresponds approximately to the depth of the slots $a'$, so that the portions of metal at opposite sides of the slots are not forced toward each other by the nut and the mutilation of the threads is prevented.

Figure 3:
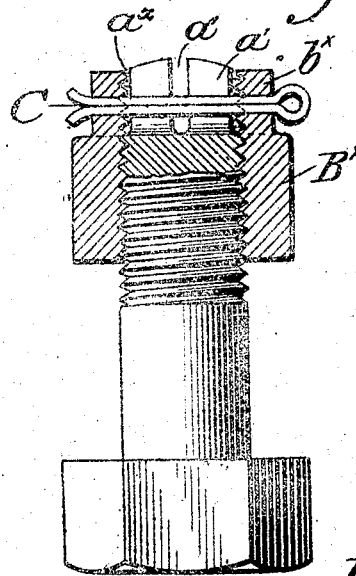

According to the form shown in Fig. 3, the plain or unthreaded portion is formed on the bolt instead of on the nut. the nut $B^x$ is threaded throughout its height or length, but the threads within the extension $b^x$ do not contact with the slotted end of the bolt, as said end is turned down to present at its extremity a smooth or unthreaded portion $a^x$ that corresponds approximately in length with the depth of the slots in the bolt. The action of a nut lock of this kind is substantially the same as that of the type shown in Fig. 1, as in each case the threaded engagement between the nut and bolt is discontinued for a distance corresponding approximately to the depth of the slots.

It is to be understood that the counterbored nut shown in Fig. 1 may be used in connection with the rounded off bolt shown in Fig. 3, if desired. It has been found that in most cases the removal of the threads from the end of the nut is alone sufficient, but under certain circumstances it may be advisable to round off the end of the bolt either in substitution for, or in addition to, the recessing or counterboring of the nut.

What we claim and desire to secure by Letters Patent of the United States is:—

1. In a nut lock a bolt having an open-ended longitudinal slot at its end, and a nut provided with holes to receive a transverse locking pin, the bolt and nut having threaded engagement which is discontinued for a distance corresponding approximately to the depth of the slot, to prevent engagement between the nut and the slotted end of the bolt when the parts are in position to receive the transverse locking pin.

2. In a nut lock, a threaded bolt having an open-ended longitudinal slot, and a threaded nut provided with holes to receive a transverse locking pin, the threads on one of said threaded members being discontinued for a distance corresponding approximately to the depth of the slot in the bolt, whereby the closing of said slot is prevented, as described.

3. In a nut lock, the combination with a threaded bolt having a slot extending longitudinally thereof and open at the extremity of the bolt, of a threaded nut provided with a plain or unthreaded portion corresponding approximately in length to the depth of the slot in the bolt, and having transverse holes in the wall of said unthreaded or plain portion to receive a locking pin.

In testimony whereof we affix our signatures in presence of two witnesses.

JULIUS SAMUEL CONRADI.
EDWARD TILSTON.
PETER WATSON MASSON.

Witnesses to the signature of Julius Samuel Conradi:
   B. LAMBERTH,
   JOSEPH LAKE.

Witnesses to the signatures of Edward Tilston and Peter Watson Masson:
   T. SELBY WARDLE,
   WM. NULLERSH JACKSON.